Figure 1:
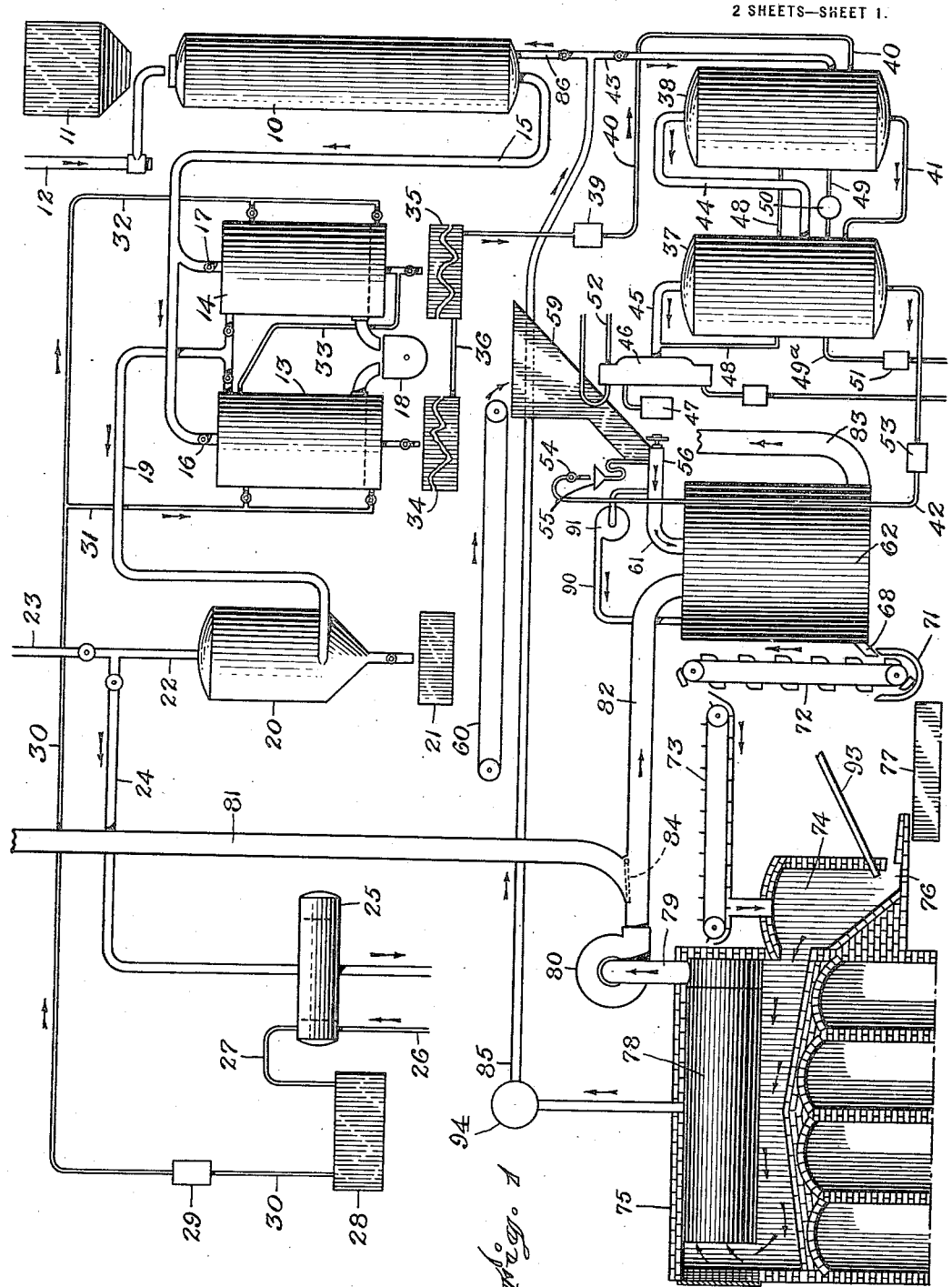

H. K. MOORE.
PROCESS OF RECOVERING THE SODA CONTENT OF WASTE LIQUOR.
APPLICATION FILED MAR. 6, 1913.

1,137,779.

Patented May 4, 1915.
2 SHEETS—SHEET 1.

Witnesses:
Walter P. Abell
Alice L. Folsom

Inventor
Hugh K. Moore
by Whyte Brown Dunlop May
Attorneys

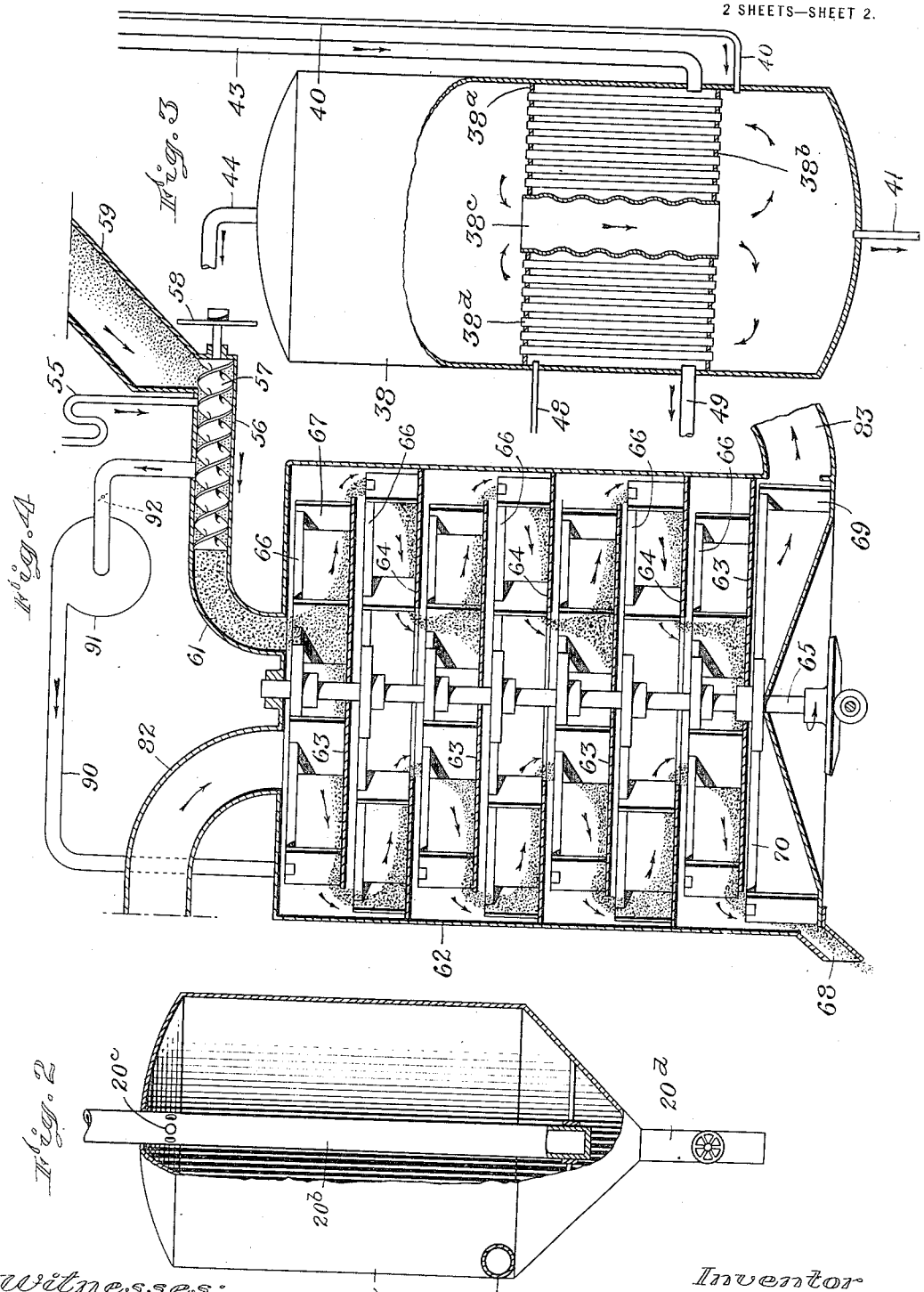

UNITED STATES PATENT OFFICE.

HUGH K. MOORE, OF BERLIN, NEW HAMPSHIRE.

PROCESS OF RECOVERING THE SODA CONTENT OF WASTE LIQUOR.

1,137,779.    Specification of Letters Patent.    Patented May 4, 1915.

Application filed March 6, 1913. Serial No. 752,365.

*To all whom it may concern:*

Be it known that I, HUGH K. MOORE, a citizen of the United States, and resident of Berlin, in the county of Coos and State of New Hampshire, have invented certain new and useful Improvements in Processes of Recovering the Soda Content of Waste Liquors, of which the following is a specification.

This invention has relation to the production of cellulose fiber from wood, and, while it has relation more particularly to the manufacture of sulfate pulp so-called, yet certain features may be employed in making either soda or sulfite fiber.

In the manufacture of pulp, great quantities of coal must be used in making steam for use in the digesters and for other purposes connected with the process, and there is a constant waste of materials, all of which increase the cost of production.

The purposes of the present invention, briefly stated, are to reduce the consumption of coal, to reclaim valuable materials heretofore wasted, and to make a better product than heretofore possible.

I shall explain my invention as used in the manufacture of sulfate pulp.

On the drawing, Figure 1 illustrates conventionally and more or less diagrammatically the instrumentalities which may be utilized in practising my process. Fig. 2 illustrates a collector for the pulp which has heretofore been wasted. Fig. 3 represents one of the evaporators for the black liquor so-called. Fig. 4 represents the fuel drier and the feeding and mixing devices which supply the black liquor and the carrier therefor.

Heretofore it has been the customary practice to evaporate the lignin or black liquor from the digesters by the use of disk evaporators and to deliver the concentrated residuum to a rotary incinerator through both of which are passed the products of combustion from a smelting furnace. The concentrated residuum is delivered from the the incinerator in a partially charred mass known as "black ash" from which the water and most of the volatile combustibles have been expelled. This black ash contains most of the soda which went into the digesters for cooking the wood chips, and for the recovery of the soda it is mixed with salt cake so-called (sulfate of soda, $Na_2SO_4$) and burned in a smelting furnace, the smelted soda being delivered to a dissolving tank containing water. Ordinarily when the solution reaches the required strength (approximately 20° Bé.), lime is added to causticize the carbonate of soda, after which the supernatant liquor, containing sodium sulfid ($Na_2S$), sodium sulfate ($Na_2SO_4$), sodium hydrosulfid (NaHS) and sodium hydrate (NaOH), is withdrawn, leaving the carbonate of lime in the tank, and is used for the next cooking.

According to my invention, I utilize the lignin or black liquor in making steam which may be employed in the digestion of the raw wood, thus reducing the consumption of coal, and I dispense with the use of the disk evaporators and rotary incinerators as I find that the utilization of direct heat is expensive and wasteful.

Briefly speaking, I employ multiple-effect evaporators in concentrating the black liquor, and with the residuum I mix sulfate of soda and a carrier of any carbonaceous material. The mixture is then dried and is fed into the smelting furnaces. The products of combustion, after they have performed their work in making steam, are carried through the drier for the drying of the mixture. The melted soda or other inorganic content from the smelting furnace is then treated in the usual way. It might appear at first glance that the results might be accomplished merely by using a multiple-effect evaporator for the concentration of the black liquor, but this is practically impossible because of the character of the residuum. When black lignin liquor is evaporated down to dryness, it is found to be of such character that it is practically impossible to handle it by any known means. It is a tar-like mass which is not a liquid but which is soft enough so that one lump put on top of another will merge into a solid mass. It cannot be chopped, broken or handled in any known way. I find that, by evaporating and condensing the black liquor to approximately 35° Bé., that is to about the consistency of treacle, it may be mixed with sawdust, pulverized bark, hogged wood or peat, coke free from iron, or other carbonaceous material, and that when so mixed it may be handled by a conveyer and otherwise manipulated and then burned.

On the accompanying drawings, 10 indicates a digester to which the chipped wood is fed from a receptacle 11. The liquor is charged into the digester from a conduit 12. The contents of the digester, after treatment, are discharged into the wash or settling tanks 13, 14 which are provided with the usual false bottoms, the conduit for the contents of the digester being indicated at 15 and being valved at 16 and 17. The pulp is discharged from the tanks 13 and 14 through spouts into a conveyer 18. When the pulp and lignin liquor was discharged into one or the other of the tanks 13, 14 at atmospheric pressure, a large volume of steam arises which is discharged through a conduit 19 into a collector 20, shown in detail in Fig. 2. The function of the collector 20 is to collect the pulp which would otherwise be discharged with the steam into the air. In detail, it consists of a metallic casing 20ª the lower end of which is an inverted cone. The inlet port from the conduit 19 is arranged tangentially so that the steam and pulp which it carries are swirled around inside of the tank.

20ᵇ indicates an eduction conduit which extends down into the conical lower end of the casing, and which near the upper end of the casing is provided with apertures 20ᶜ. The pulp, which remains in the collector, is discharged through the valve outlet 20ᵈ into a tank 21. The steam, when freed from the pulp, passes from the pipe 20ᵉ into a pipe 22 and may be discharged into the air through a valved conduit 23 or else may be carried through the valved conduit 24 to a surface condenser 25, so that its heat may be utilized in heating water to be used in washing the tanks 13 and 14. Water, entering the condenser through a pipe 26, after being heated is conveyed through a pipe 27 to a hot water tank 28. From this tank the heated water is forced by a pump 29 through a pipe 30, branch pipes 31, 32, connected by valved branches to the several compartments of the tanks 13 and 14. The tanks 13 and 14 are connected in the usual way by a pipe 33 so that the water used to wash one tank may be carried into the next tank to wash it. The black liquor and the water used to wash the tanks may be discharged from the tanks 14 into tanks or receptacles 34, 35 which are connected by a pipe 36 as shown. It is from these tanks that the black liquor is discharged into the multiple-effect evaporator as will be explained. It will be understood that, while I have shown but one digester and but two wash tanks 13 and 14, there may be a series of digesters and also a series of wash tanks according to the requirements of the mill.

At 37, 38 I have indicated mutiple-effect evaporators for the black liquor. Only two combined condensers and evaporators are shown, but in practice I prefer to use a quintuple effect. The black liquor is forced by a pump 39 through a pipe 40 from the tank 35 into the No. 1 evaporator 38. The partially condensed liquor is carried by the pipe 41 into the No. 2 evaporator indicated at 37, and so on through the series. After the black liquor has been evaporated to approximately the consistency of treacle or substantially 35° Bé., it is forced through the pipe 42 into a mixer as will be explained. As a matter of detail, it will be noted that steam is introduced into the first condenser 38 through a valved pipe 43. In Fig. 3, one of the combined condensers and evaporators is shown. It has the partitions 38ª, 38ᵇ with a large corrugated central conduit 38ᶜ. The black liquor passes upwardly through the tubes 38ᵈ and down through the central conduit 38ᶜ, the partially concentrated black liquor passing out through the pipe 41 at the bottom of the evaporator. From the top of the evaporator a steam pipe 44 passes into the condensing chamber of the next evaporator. From the last evaporator, which in this case is indicated at 37, the steam pipe 45 discharges into a condenser 46 with which is connected a vacuum pump 47.

It will be understood that the combined condensers and evaporators are provided with a pipe 48 for the relief of the contained air and also with pipes 49, 49ª for the water of condensation, the latter being respectively provided with a trap 50 and a pump 51.

52 indicates the pipe for supplying the condenser 46 with a cooling medium.

It will be understood that the parts are not shown in Fig. 1 at their respective levels since the figure is a diagrammatic illustration of the parts. Their relative dimensions are roughly indicated and such instrumentalities as pumps are indicated in the most conventional manner.

After the lignin or black liquor has been condensed to approximately 35° Bé., it is forced through the pump 53 through the pipe 42, which is valved as at 54, to a trapped funnel 55 leading to a mixing chamber 56 as best shown in Fig. 4. This mixing chamber is substantially cylindrical and is provided with a helicoid or worm conveyer 57 which may be driven from any suitable source of power through the medium of a belt pulley or sprocket 58. With the receiving end of the casing communicates a hopper 59 into which is discharged, from a traveling conveyer 60, sawdust, peat or other carbonaceous material, together with a certain amount of sulfate of soda. The black liquor is discharged into the mixing chamber at a point close to its receiving end so that the carbonaceous material and the black liquor are thoroughly mixed and intermingled as they are passed through the casing by the worm conveyer. The casing is provided with an outlet 61 which communicates with the interior of a drier indicated as a whole at 62. This drier consists of a casing suitably insulated on its exterior to prevent the loss of heat. Within the casing are a plurality of shelves or partitions indicated at 63, 64. The partitions 63 are of somewhat less diameter than the casing so as to leave a space through which the material may drop to the partitions next below. The partitions 64 are provided with apertures at their middle portions through which the material may fall to the partitions 63. Extending upwardly through the drier there is a shaft 65 driven by any suitable form of gearing from an external source of power. Secured to this shaft are radially extending arms 66 provided with scrapers 67. These scrapers are arranged at such an angle that the material on the partition 63 is forced outwardly, whereas the material on the partition 64 is forced inwardly, thus insuring the feeding of the material downwardly from partition to partition until it is finally discharged from the lower partition 63 into the bottom of the casing, where there is an inclined outlet chute 68. The dried material is forced out through the outlet by scrapers 69 on radial arms 70 affixed to the shaft 65. The dried material, which is discharged through the chute 68, falls into a receptacle 71 from which it is lifted by a bucket conveyer 72 and delivered to a belt conveyer 73 from which it is discharged into the combustion chamber 74 of the combined smelting furnace and boiler indicated as a whole at 75. I have not shown the combined smelting furnace and boiler in detail, but it will be understood that the combustion chamber is provided with twyers as at 93 through which air blasts are delivered to the chamber to insure the proper combustion. From the bottom of the combustion chamber there is a well 76 to receive the melted soda or other inorganic content and from which the latter continuously flows in molten condition to a mixing tank 77 containing water. The products of combustion from the combustion chamber 74 are carried through the boiler which is indicated as a whole at 78 and is delivered through a conduit 79 to a fan 80 by which they are forced either into the atmosphere through a stack 81 or else through a conduit 82 to the top of the drier 62. The hot products of combustion pass downwardly through the drier into contact with the material to be dried and pass outwardly through an eduction stack 83 to the atmosphere.

At 84 I have shown a gate damper for deflecting the products of combustion either through the stack 81 or through the conduit 82. From the boiler 78 the generated steam is carried to the steam main 85, a valved branch 86 of which supplies the digesters, and the aforesaid valved pipe 43 supplies the multiple-effect evaporators.

In operation, the digesters are filled with chipped wood, after which the alkaline liquor usually containing sodium sulfid, sodium sulfate, caustic soda and sodium hydrosulfid is delivered into the digester so as to fill it. The cover is then placed upon the digester and steam is injected so that the contents will be cooked at approximately 100 pounds pressure. After the cooking has been completed, the contents of the digester are blown into one or the other of the tanks 13 and 14. Inasmuch as the interior of the tank is at approximately atmospheric pressure, great volumes of steam are evolved which are emitted through the conduit 19 and are blown into the casing 20. Here the pulp, which is carried off with the steam, is collected, the freed steam being either admitted to the atmosphere or else carried through the condenser 25 to heat the water which is subsequently used for washing the tank. The pulp is removed from the tank 13 or 14 as the case may be and the black liquor containing the lignin content is discharged into one or the other of the tanks 34. The tank is then washed so as to remove all of the black liquor which may remain therein. It will be understood that, where there is a series of tanks, they will be subjected to a series of washings, the water being discharged into one or the other of the tanks 34, 35. The waste or black liquor is then pumped to the multiple-effect evaporators or condensers from which it is discharged in a condition containing between 50% and 60% solid matter or at 35° Bé. It is then substantially of the consistency of treacle and is forced by the pump to the mixer 56 where it is mixed with sawdust, pulverized bark, hogged wood, coke or the like, and also with the necessary quantity of sodium sulfate. Where there are in a mill one or more of the old types of rotary incinerators, the black ash may be used as the carrier for the concentrated black liquor. After the black liquor and its carrier are mixed, they are delivered to the drier. The hot gases from the smelting furnace are forced under pressure through the drier at a temperature ranging from 400° to 550° F., the temperature of the gases leaving the fuel drier ranging from 220° to 230° F. The hot gases travel through the drier in the same direction with the material to be dried so that there is little liability of the material being ignited by sparks carried with the hot gases. As the mixture of hot liquor and its carrier are carried through the drier, they are sufficiently dried so that they are capable of being burned. After the mixture is delivered from the drier, it is delivered to the combustion chamber of the smelting furnace. Here the soda in the black ash is changed into carbonate of soda while the sulfate of soda is reduced by the carbonaceous matter to sodium sulfid. Undoubtedly part of this sulfate is reduced as follows:

$$2Na_2SO_4 + C = 2Na_2O + 2SO_2 + CO_2;$$

also $$Na_2SO_4 + 2C = Na_2S + 2CO_2;$$

and $$Na_2SO_4 + 4C = Na_2S + 4CO;$$

with the subsequent formation of carbonate as follows:

$$Na_2O + CO_2 = Na_2CO_3.$$

The smelted soda flows continuously from the well 76 into the water in the tank 77. The carbonate of soda passes into the solution without change, the sodium sulfid breaking up as follows:

$$Na_2S + H_2O = NaHS + NaOH.$$

When the solution in the tank 77 reaches the desired strength (approximately 20° Bé.), it is pumped to the alkaline room where the required amount of lime is added to causticize the carbonate of soda as previously explained.

The mixture, containing the black liquor, sodium sulfate and the carbonaceous material, is of relatively high specific gravity so that it will not be carried away by the tremendous air blast which is necessary in order to burn it. The flue gases from the furnace generate the steam necessary for operating the plant and act to dry the mixture as explained.

I have ascertained that the evaporated black liquor from the digester contains very nearly 6,000 British thermal units per pound of solid matter, and, by the method which I have described, I am able to utilize the heat in the generation of steam for operating the mill.

The process which I have described has numerous advantages. Even where it is necessary to operate a single coal-burning furnace in the mill to take care of the go and come, it is possible to save approximately 75% of the fuel heretofore necessary. Again, owing to the thorough mixture of the sulfate of soda with the black liquor, the effluent from the smelting furnace contains a better mixture for making sulfate pulp than has been possible heretofore. For example, there is a much greater percentage of sulfid of soda in the aqueous solution in the tank 77 than has been heretofore possible. Another advantage which I have found is that, by passing the flue gases from the smelting furnace through the drier into contact with the mixture of black liquor and carbonaceous material, practically all of the volatilized soda is caught by the mixture and by the shelves or partitions of the fuel drier and saved.

One of the difficulties which I have experienced in carrying out the process was the emission of flue gases from the drier. There is of course a resistance to the passage of the gases caused by the shelves or partitions, and the problem was to introduce solid matter into the drier and remove it therefrom, and at the same time prevent the emission of the flue gases. This problem was solved by feeding the solid matter and black liquor to the mixer 57 in which was the helical conveyer, and also by delivering the dried material through the chute 68 into the receptacle 71, thus preventing the emission of the gases at these points.

To insure against the possibility of the passage of the gas through the mixing chamber, I connect the delivery end of the mixing chamber with the drier by a conduit 90 in which is interposed an exhaust fan 91. A damper is employed, as indicated in dotted lines at 92, so that I secure practically a balanced draft. In consequence of this construction, any gases that get into the mixing chamber are immediately returned to the fuel drier with possibly a little air that may be sucked from the hopper and mixing chamber.

As a matter of detail in the construction of the drier, I line it with cement consisting of plastic material such as a mixture of tar and asbestos or any other suitable cement, so that the flue gases will not come in contact with the metallic casing. The greatest efficiency is secured by properly insulating with heat-insulating material the various conduits and pipes and the drier, the pulp collector, etc., into which heated liquids or gases are delivered or by which they are conducted from one point to another.

While I have described more or less in detail the instrumentalities which I utilize in carrying out my invention, since they are the best forms now known to me, it will be understood that my invention is not limited in its entirety thereto and that various changes may be made without departing from the spirit and scope of the invention. So far as I know, I am the first to mix the concentrated black liquor with a carbonaceous carrier and to burn the mixture to recover the inorganic content of said liquor; alst to dry the mixture by the flue gases resulting from the combustion of another portion of the mixture, and also to utilize the same flue gases in making steam for employment in the digesters and for such other purposes as it may be necessary to use it. The fact that the concentracted black liquor is mixed with the carbonaceous carrier enables it to be handled and dried. The black liquor is absorbed on the surfaces and in the pores of the carrier to such an extent that it does not form a sticky mass which cannot be manipulated. When properly mixed and dried as herein described, the sawdust or other carrier will be delivered from the drier saturated with the solid matter from the black liquor and will be of high specific gravity.

Having thus explained the nature of my said invention and described a way of making and using the same, although without attempting to set forth all of the forms in which it may be made or all of the modes of its use, what I claim is:

1. The herein described process of treating the waste liquor resulting from the digestion of wood which consists in mixing the liquor with a carbonaceous carrier, burning the mixture, and simultaneously smelting and recovering the inorganic content of the said liquor.

2. The herein described process which consists in mixing the lignin liquor with a solid corbonaceous carrier, supplying air under pressure to and burning the mixture in a smelting furnace, smelting the contained soda, and recovering the soda.

3. The herein described process which consists in mixing lignin liquor containing soda with a carbonaceous carrier and sodium sulfate, supplying air under pressure to and burning said mixture, smelting the soda, and recovering the smelted soda.

4. The herein described process of recovering soda from the waste liquor resulting from the digestion of wood which consists in mixing the liquor with a carbonaceous carrier and sodium sulfate, burning a dried mixture of said liquor and said carrier, smelting the contained soda and recovering the same, and drying the first-mentioned mixture by contact with the gaseous products of combustion resulting from burning a like dried mixture.

5. The herein described process which consists in mixing lignin liquor with a carbonaceous carrier, burning a previously dried mixture of said lignin liquor and said carrier in a smelting furnace, recovering the smelted soda, and with the resulting gaseous products of combustion drying the first-mentioned mixture.

6. The herein described process which consists in continuously commingling and concentrating lignin liquor, continuously mixing a solid carbonaceous carrier with the concentrated liquor, continuously feeding the mixture to a combustion chamber, continuously burning said mixture and smelting the inorganic content of the concentrated liquor, and continuously recovering said inorganic content in molten condition.

7. The herein described process which consists in continuously concentrating lignin liquor, continuously mixing a carbonaceous material with the concentrated liquor, continuously drying said mixture, continuously feeding said dried mixture to a smelting furnace, continuously burning said dried mixture and smelting the inorganic content of said liquor, and continuously withdrawing said inorganic content in molten condition.

8. The herein described continuous process which consists in burning in a smelting furnace a dried mixture of carbonaceous material, lignin liquor and sodium sulfate, smelting and recovering the contained soda, mixing another body of lignin liquor and carbonaceous material, and drying the last-mentioned mixture by passing the products of combustion of the first mentioned mixture in contact therewith.

9. The herein described continuous process which consists in continuously concentrating lignin liquor, continuously burning in a smelting furnace a dried mixture of carbonaceous material, concentrated lignin liquor and sodium sulphate to recover the soda in the lignin liquor, passing the products of combustion through a boiler for the production of steam, using said steam in the concentration of lignin liquor, mixing another body of concentrated liquor and carbonaceous material, and drying the last-mentioned mixture by passing said products of combustion in contact therewith.

10. The herein described process which consists in continuously evaporating and condensing the waste liquor from a digester to approximately 35° Bé., continuously mixing a carbonaceous carrier therewith, continuously drying the mixture to a combustible condition, continuously burning said mixture and smelting the inorganic content thereof, and recovering the smelted content.

11. The herein described process which consists in continuously burning a dried mixture of lignin liquor residuum and a carbonaceous carrier in a smelting furnace, continuously mixing aqueous lignin liquor and said carrier, continuously passing the gaseous products of combustion into contact with said mixture to dry it, continuously feeding said dried mixture into said furnace to be thus burned, and continuously smelting and recovering the inorganic content of said mixture.

12. The herein described process which consists in continuously burning a dried mixture of lignin liquor residuum and a carbonaceous carrier in a furnace, continuously mixing aqueous lignin liquor and said carrier, continuously feeding said mixture to the furnace to be thus burned, and continuously passing the gaseous products of combustion into contact with and in the direction of movement of said mixture thus being fed, for drying said mixture previous to its being burned.

In testimony whereof I have affixed my signature, in presence of two witnesses.

HUGH K. MOORE.

Witnesses:
WALTER P. ABELL,
JOHN E. POVEY.